United States Patent
Brown et al.

(10) Patent No.: US 10,370,941 B2
(45) Date of Patent: Aug. 6, 2019

(54) WELL PERFORMANCE INDEX METHOD FOR EVALUATING WELL PERFORMANCE

(71) Applicants: Ian Graham Brown, Houston, TX (US); Eric Thiessen, Houston, TX (US); Coen Smits, Houston, TX (US)

(72) Inventors: Ian Graham Brown, Houston, TX (US); Eric Thiessen, Houston, TX (US); Coen Smits, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 403 days.

(21) Appl. No.: 15/139,476

(22) Filed: Apr. 27, 2016

(65) Prior Publication Data

US 2016/0312608 A1 Oct. 27, 2016

Related U.S. Application Data (60) Provisional application No. 62/153,265, filed on Apr. 27, 2015.

(51) Int. Cl.
*E21B 43/00* (2006.01)

(52) U.S. Cl.
CPC .................................. *E21B 43/00* (2013.01)

(58) Field of Classification Search
None
See application file for complete search history.

(56) References Cited

U.S. PATENT DOCUMENTS 7,963,327 B1 * 6/2011 Saleri .................. E21B 43/00
                                                 166/252.1
8,463,585 B2   6/2013 Sun et al.
(Continued)

FOREIGN PATENT DOCUMENTS

WO    2010090825 A2    8/2010
WO    2015077581 A1    5/2015
WO    2015138724 A1    9/2015

OTHER PUBLICATIONS

"Transforming the equipment or the device by at least one of repairing, modifying, and replacing the equipment or the device for any production well identified as under-performing in order to improve performance" by Oil States (Year: 2017).*
International Search Report, and the Written Opinion of the International Searching Authority, or the Declaration; PCT/US2016/066951; dated Apr. 10, 2017; 16 pages.

(Continued)

*Primary Examiner* — Evren Seven
(74) *Attorney, Agent, or Firm* — Cantor Colburn LLP (57) ABSTRACT

A method for ranking performance of each production well in a plurality of production wells includes sensing a production parameter value for each production well using a sensor and receiving the production parameter value for each production well using a processor. The method also includes performing two or more different calculations for each production well using the production parameter value, each calculation providing a calculated performance indicator, multiplying each calculated performance indicator by a weight factor to provide a weighted performance indicator; and summing each of the weighted performance indicators for each production well to provide a unit-less performance index value for each production well. The method further includes inputting into the processor a threshold value of the unit-less performance index and identifying any production well that has a corresponding unit-less performance index value that exceeds the unit-less performance index threshold value as an under-performing well.

12 Claims, 6 Drawing Sheets

(56) References Cited

U.S. PATENT DOCUMENTS

| | | | |
|---|---|---|---|
| 8,676,721 B2 | 3/2014 | Piovesan et al. | |
| 8,892,412 B2 | 11/2014 | Ghayour et al. | |
| 2007/0005253 A1* | 1/2007 | Fornel | E21B 43/00 |
| | | | 702/14 |
| 2011/0186353 A1* | 8/2011 | Turner | G05B 13/048 |
| | | | 175/40 |
| 2014/0324521 A1* | 10/2014 | Mun | G06Q 10/06393 |
| | | | 705/7.28 |
| 2014/0376710 A1* | 12/2014 | Shaffer | H04M 3/5175 |
| | | | 379/265.06 |
| 2016/0164732 A1* | 6/2016 | Suerbaum | H04L 41/0816 |
| | | | 370/328 |
| 2016/0187508 A1* | 6/2016 | Plost | G06Q 50/02 |
| | | | 702/6 |
| 2016/0253767 A1* | 9/2016 | Langenwalter | E21B 43/00 |
| | | | 705/7.38 |
| 2016/0312552 A1 | 10/2016 | Early et al. | |
| 2017/0177761 A1 | 6/2017 | Early et al. | |

OTHER PUBLICATIONS

Mohaghegh, et al.; "Top-Down, Intelligent Reservoir Modeling of Oil and Gas Producing Shale Reservoirs; Case Studies"; INt. J, Oil, Gas and Coal Technoloigy vol. 5, No. 1, 2012; 12 pages.

Vera, et al.; "Describing Shall Well Performance Using Transient Well Analysis"; May 2014; Retrieved from the internet; URL: http//www.spe.org/enprint-article/?art=537, 5 pages.

* cited by examiner

WELL PERFORMANCE INDEX METHOD FOR EVALUATING WELL PERFORMANCE

CROSS REFERENCE TO RELATED APPLICATIONS

This application claims the benefit of an earlier filing date from U.S. Provisional Application Ser. No. 62/153,265 filed Apr. 27, 2015, the entire disclosure of which is incorporated herein by reference.

BACKGROUND

Asset management teams conduct periodic well performance reviews of wells for the production of hydrocarbons. A well review is a way of ranking well performance and identifying problem wells, action items and the like. However, well performance reviews can be time consuming and there is no easy way to identify all underperforming wells within an asset. Single Key Performance Indicators (KPIs) can only identify certain problems and may not identify all underperforming wells. Due to the costly nature of hydrocarbon production, well performance reviews may be of value to managers managing these assets. Unfortunately, asset performance teams may have limited budget and resources necessary to perform a multitude of well performance reviews using multiple KPIs in order to identify all underperforming wells. Hence, methods to improve well performance reviews to identify all underperforming wells would be well received in hydrocarbon production industries.

BRIEF SUMMARY

Disclosed is a method for ranking performance of each production well in a plurality of production wells. The method includes: sensing a production parameter value for each production well using a sensor; receiving the production parameter value for each production well using a processor; performing with the processor two or more different calculations for each production well using the production parameter value, each calculation providing a calculated performance indicator; multiplying with the processor each calculated performance indicator by a weight factor to provide a weighted performance indicator; summing with the processor each of the weighted performance indicators for each production well to provide a unit-less performance index value for each production well; inputting into the processor a threshold value of the unit-less performance index; and identifying any production well that has a corresponding unit-less performance index value that exceeds the unit-less performance index threshold value as an under-performing well using the processor.

Also disclosed is an apparatus for ranking performance of each production well in a plurality of production wells. The apparatus includes a production rig disposed at each production well, a sensor disposed at each production rig and configured to sense a production parameter, and a processor. The processor is configure to: receive the production parameter value for each production well; perform two or more different calculations for each production well using the production parameter value, each calculation providing a calculated performance indicator; multiply each calculated performance indicator by a weight factor to provide a weighted performance indicator; sum each of the weighted performance indicators for each production well to provide a unit-less performance index value for each production well; receive a threshold value of the unit-less performance index; and identify any production well that has a corresponding unit-less performance index value that exceeds the unit-less performance index threshold value as an under-performing well.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are method and apparatus for ranking performance of each production well in a plurality of production wells. One or more sensors disposed at each production well measures a production parameter value or values associated with production of hydrocarbons. The sensed parameter values from the plurality of production wells are received by a processor. The processor performs two or more separate calculations by applying an algorithm to the sensed parameter values to provide two or more corresponding performance indicators for each production well. The processor then multiplies each performance indicator by a weighting factor to provide weighted performance indicators. The weighting factors may be input by a user to reflect an importance placed on specific performance indicators by the user. The processor sums the weighted performance indicators for each production well to provide a corresponding unit-less performance index value. The ranking is provided by comparing the unit-less performance index value for one production well to the performance index values of the other production wells such that the production well with the lowest unit-less performance index value is highest ranked in production well performance. That is in one or more embodiments, the highest score relates to the lowest performance while the lowest score relates to the highest performance.

Figure 1:
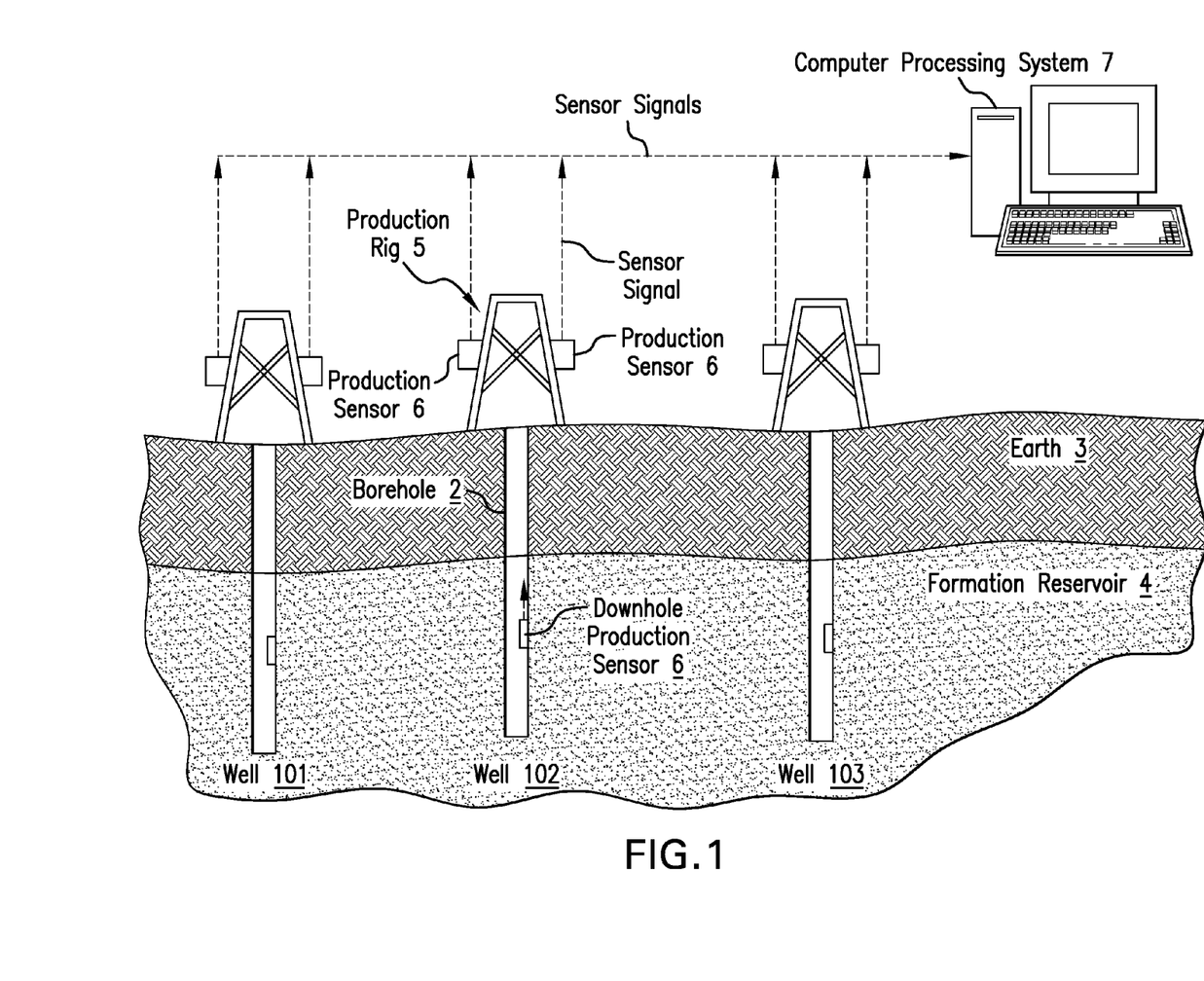
FIG. 1 illustrates a cross-sectional view of a plurality of production wells.

FIG. 1 illustrates a cross-sectional view of a plurality of production wells configured to produce a hydrocarbon fluid. A first production well 101, a second production well 102 and a third production well 103 are illustrated for teaching purposes. The production wells may be distributed across the globe, at similar fields, or at the same field. Each production well includes a borehole 2 penetrating the earth 3 having a formation reservoir 4. Further, each well includes a production rig 5. The production rig 5 is configured to extract the hydrocarbon fluid from the formation reservoir via the borehole and transport the hydrocarbon fluid to the surface of the earth. Each production rig includes one or more production sensors 6. Each production sensor 6 is configured to sense or measure a value of a production parameter. Non-limiting embodiments of production parameters include inflow rate into the borehole, extraction flow rate, temperature, and pressure. Production parameters may also include parameters of equipment, such as pumps, used to extract the hydrocarbon fluid. Non-limiting embodiments of equipment parameters include speed, temperature, vibration, voltage, current and power. Production sensors may be disposed at the surface of the earth or downhole. Signals that include sensor data are transmitted to a computer processing system 7 for processing in accordance with techniques discussed below.

The method and apparatus call for performing two or more calculations for each well using algorithms that model a particular performance aspect of the corresponding well. Each algorithm operates on data obtained from the production sensors to provide a particular performance indicator (PI). The PI may be expressed mathematically as: $PI_n=f_n(x, y, z)$ where n represents a particular performance model and x, y and z represent different types of sensor data recognizing that there may be any number of different types of sensor data. The algorithm may use common sensor data or sensor data that is unique to that particular algorithm. Once two or more performance indicators are obtained for each well, they are individually weighted with a weighting factor and then combined to provide a performance index value. Because the performance indicators may be based on different units, the performance index value is unit-less and maybe referred to as the unit-less performance index value. The unit-less performance index (PIdx) may be expressed mathematically as $PIdx=(w_1 \cdot PI_1)+(w_2 \cdot PI_2)+(w_3 \cdot PI_3)$ for three different performance indicators where $w_1$, $w_2$ and $w_3$ represent weighting factors for the corresponding performance models. More generally, PIdx may be represented in one or more embodiments as $$PIdx = \sum_n w_n * PI_n.$$

Values of weighting factors may be assigned by a user based on the user's perceived value or importance of a particular performance model.

Although unit-less, the performance index value provides a way to normalize performance and compare the performance of wells to each other and, thus, rank the wells according to their comparable performance. Unit-less indices are used in other fields such as finance (e.g., Dow Jones Industrial average, S&P 500 Index and Institute of Supply Management Manufacturing Index) for rating performance.

In one example of a performance index process, three different calculations are performed. A first calculation (Calculation 1) is a rate deviation calculation, a second calculation (Calculation 2) is a model deviation calculation, and a third calculation (Calculation 3) is a rate decline calculation. The rate decline calculation is the deviation of the metered (or measured) rate from the estimated (or calculated) rate. In this calculation, the measured rate could be replaced by a generally accepted rate such as an allocated rate (i.e., a rate not directed metered but inferred using other measurements) in lieu of a having metered rate.

Difference (%)=measured value/estimated value*100.

Figure 3:
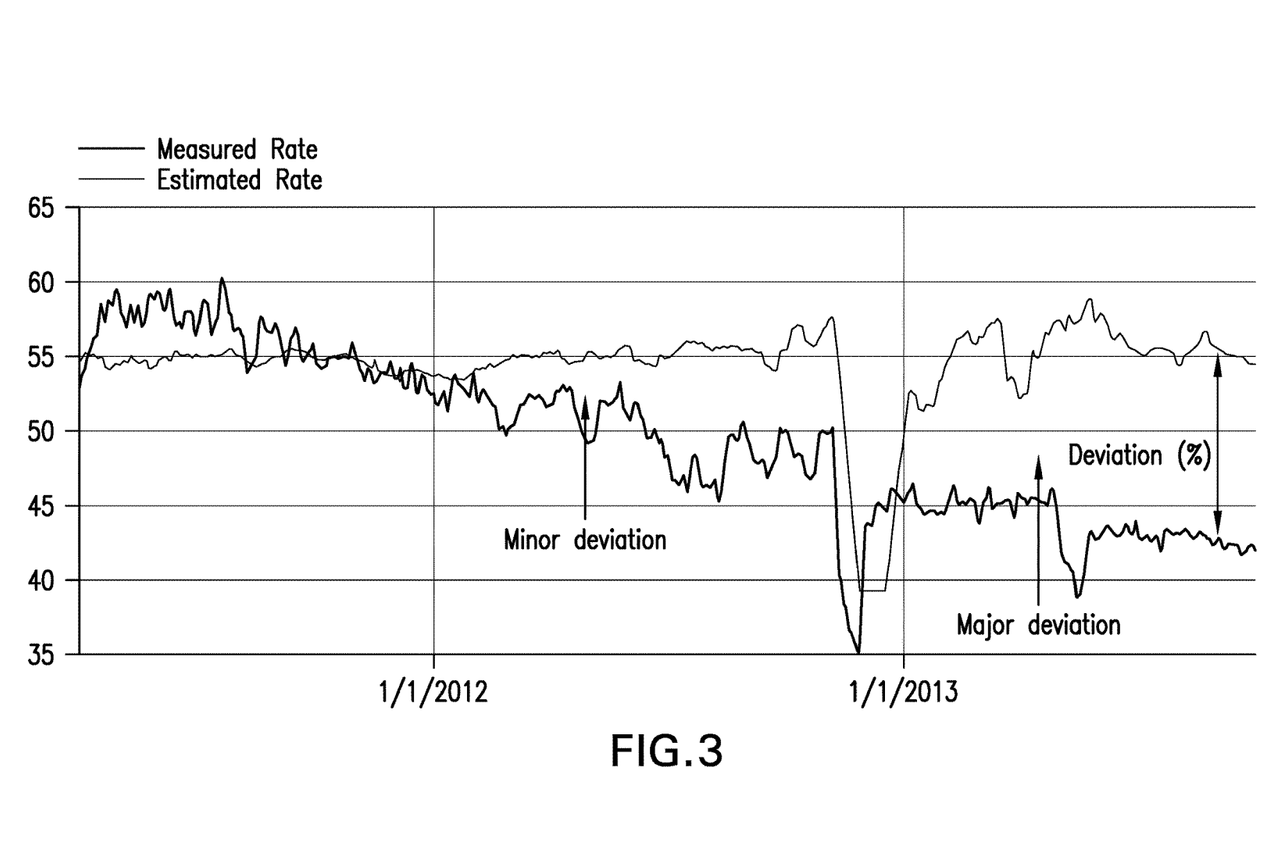
FIG. 3 depicts aspects of a visual example of a rate decline calculation.

The resulting percentage is used as the output of Calculation 1. If the calculation could not be performed (e.g., by data being unavailable), then the answer is 0. FIG. 3 depicts aspects of a visual example of the rate decline calculation. Deviations within a defined minor deviation range are labeled as a minor deviation. Deviations that exceed the minor deviation range are labeled major deviations.

Figure 4A:
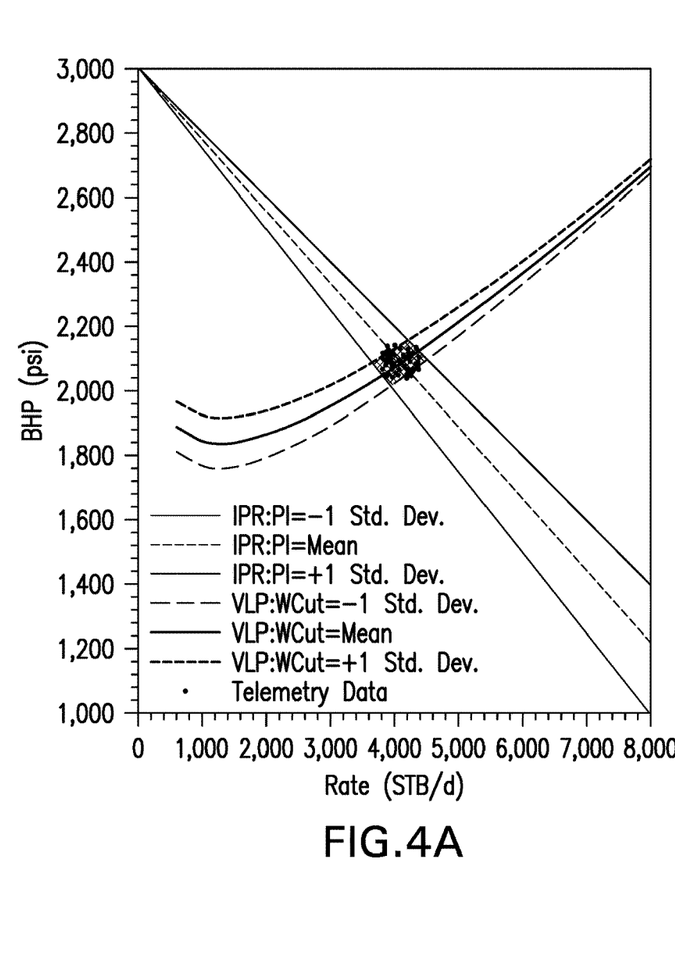
FIGS. 4A and 4B, collectively referred to as FIG. 4, depict aspects of a visual example of a model deviation calculation.
Figure 4B:
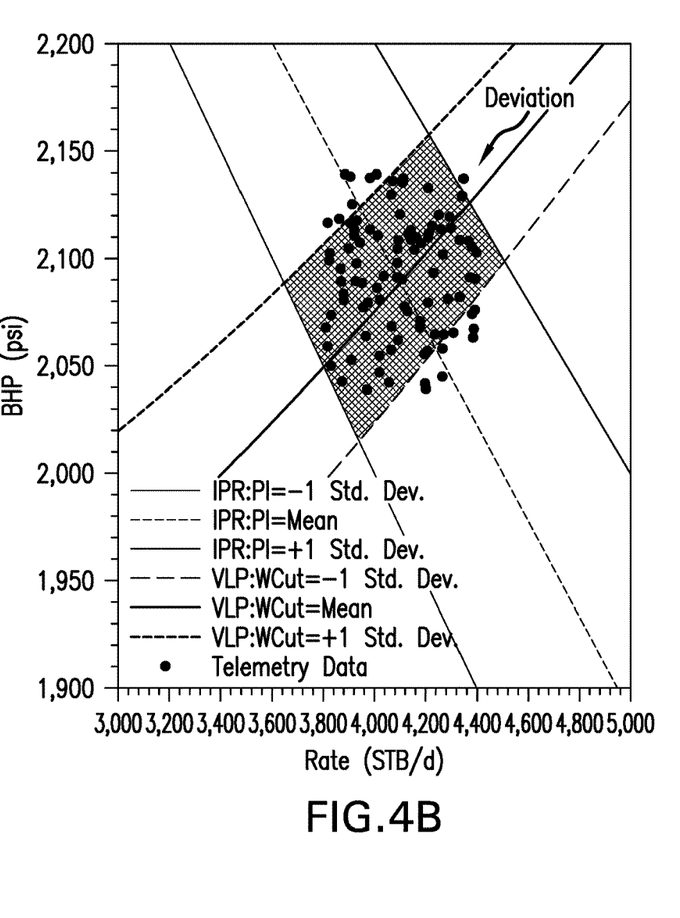

The model deviation calculation is performed if there is access to a model inflow performance relationship (IPR) and vertical lift performance (VLP) data associated with the well on which the calculation is being performed. A standard deviation is used to define the boundaries of the IPR and VLP Curve. This creates a "zone of tolerance." The metered Production Rate and Bottom Hole Pressure are then compared against the zone of tolerance. If the data is outside of the zone of tolerance, then a deviation has occurred. If a deviation occurs, then the distance from the zone of tolerance is used as the output of Calculation 2. The output number is a percentage (%) based on the distance from the tolerance zone. For example, the percentage may be determined by the distance to the boundary divided by the width of the boundary times 100. If no deviation occurs, the answer is 0. If the calculation could not be performed due to the lack of a model or data, the answer is 0. FIG. 4 depicts aspects of a visual example of the second calculation where FIG. 4B is a magnification of the intersection portion of FIG. 4B.

The production decline calculation is the slope (or gradient) of decline based on the measured production rate. Production decline may be measured in Barrels of Oil per Day (BOPD) or million standard cubic feet (MSCF) for gas. In this calculation, the measured rate could be replaced by a generally accepted rate such as an allocated rate (i.e., a rate not directed metered but inferred using other measurements) in lieu of a having a measured rate. Three (3) curve fitting algorithms are performed on a sample of the measured rate—exponential, hyperbolic and harmonic. If all three curves fit the data, the hyperbolic curve fit is used to calculate the slope. Then preference falls to harmonic and last to exponential. The absolute (ABS) of the slope is used as the output of Calculation 3. The output value will be a percentage (%). If no curve fits the data, the output value of Calculation 3 is 0. If the calculation could not be performed, the answer is 0. The three curve fits are calculated using algorithms that are accepted and documented within the oil and gas industry.

At this point in the process, each well will have a percentage score for each calculation and each well will have a three (3) difference percentage scores. Before assigning a final score to the well a weighting factor is assigned for each of the calculations. The factor can be any number; a higher number will produce a greater influence on the final well calculation score. For example, Calculation 1 may have a weighting factor of 1, Calculation 2 may have a weighting factor of 1, and Calculation 3 may have a weighting factor of 2. Each calculation score is multiplied by the weighing factor. The results of each factored score are summed to create the final score.

Calculation 1 Score=20% (initial score)*1 (factor)=20

Calculation 2 Score=5% (initial score)*1 (factor)=5

Calculation 3 Score=2% (initial score)*2 (factor)=4

Summing the three weighted calculation scores gives a sum total score of 29 (unit-less). In this type of scoring (i.e., inversely related), higher scores indicate lower performance, and lower scores indicate higher performance. It can be appreciated that in other embodiments the scoring system can be reversed (i.e., directly related) such that the higher the score indicates higher performance while the lower the score indicates lower the performance.

Based on the unit-less performance indices of the wells, the wells can be ranked in order from low-performance to high-performance. Further, the user can use a performance index threshold value to identify those wells having a performance index value that exceeds the threshold value as "low performing wells." The threshold value can be based on experience or a mathematical metric such as an average index value or mean index value of all the wells. It can be appreciated that the term "exceeds the threshold value" may be dependent on whether the type of scoring system used is inversely related or directly related so that the lower performing wells are correctly identified.

Once low performing wells are identified, action can be initiated, such as by automatically issuing a work order, to remedy the performance of those wells. For example, the work order can be for fixing a pump that is drawing more power than a pump model would indicate that it should draw. Further, the work order may indicate several items to be corrected if those items have contributed to the low performance of the wells. Actual work related to the work order may be performed after issuance of the work order using apparatus, equipment and/or tools necessary to carry out the actual work. Non-limiting embodiments of the actual work include fixing, modifying and/or replacing equipment or devices. Alternatively, the actual work may relate to correcting digital processing issues requiring software fixes, modifications or changes.

Figure 2:
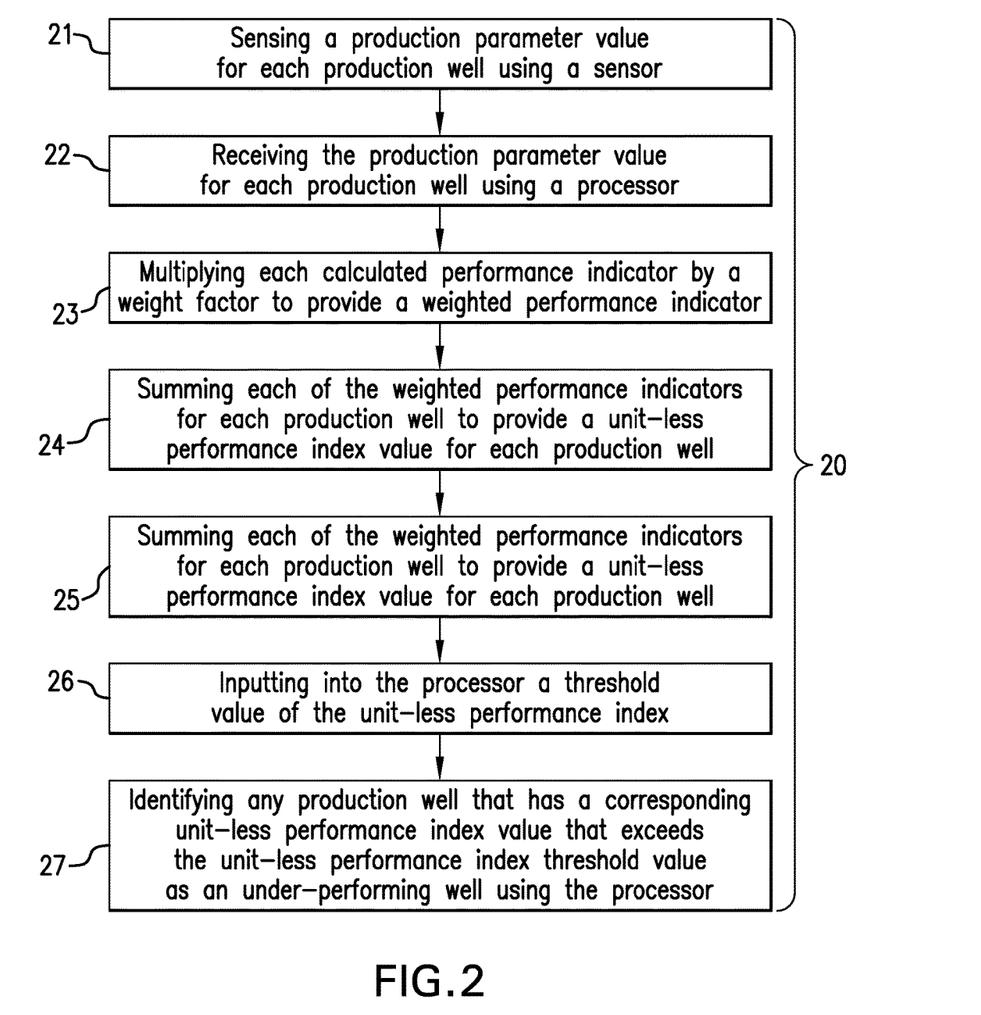
FIG. 2 is a flow chart for a method for ranking performance of each production well in a plurality of production wells.

FIG. 2 is a flow chart for a method 20 for ranking performance of each production well in a plurality of production wells. Block 21 calls sensing a production parameter value for each production well using a sensor. Block 22 calls for receiving the production parameter value for each production well using a processor. Block 23 calls for performing with the processor two or more different calculations for each production well using the production parameter value, each calculation providing a calculated performance indicator. Block 24 calls multiplying with the processor each calculated performance indicator by a weight factor to provide a weighted performance indicator. Block 25 calls for summing with the processor each of the weighted performance indicators for each production well to provide a unit-less performance index value for each production well. Block 26 calls for inputting into the processor a threshold value of the unit-less performance index. Block 27 calls for identifying any production well that has a corresponding unit-less performance index value that exceeds the unit-less performance index threshold value as an under-performing well using the processor.

The method 20 may also include transmitting a signal comprising one or more unit-less performance index values to a signal receiving device. The signal receiving device may be a printer or display for displaying the one or more unit-less performance index values to a user or the signal receiving device may be memory or a storage medium for storing the one or more unit-less performance index values.

The method 20 may also include performing an action on an underperforming well to improve the unit-less performance index value of the corresponding underperforming well. The method 20 may further include automatically issuing a work order to perform the action.

Figure 5:
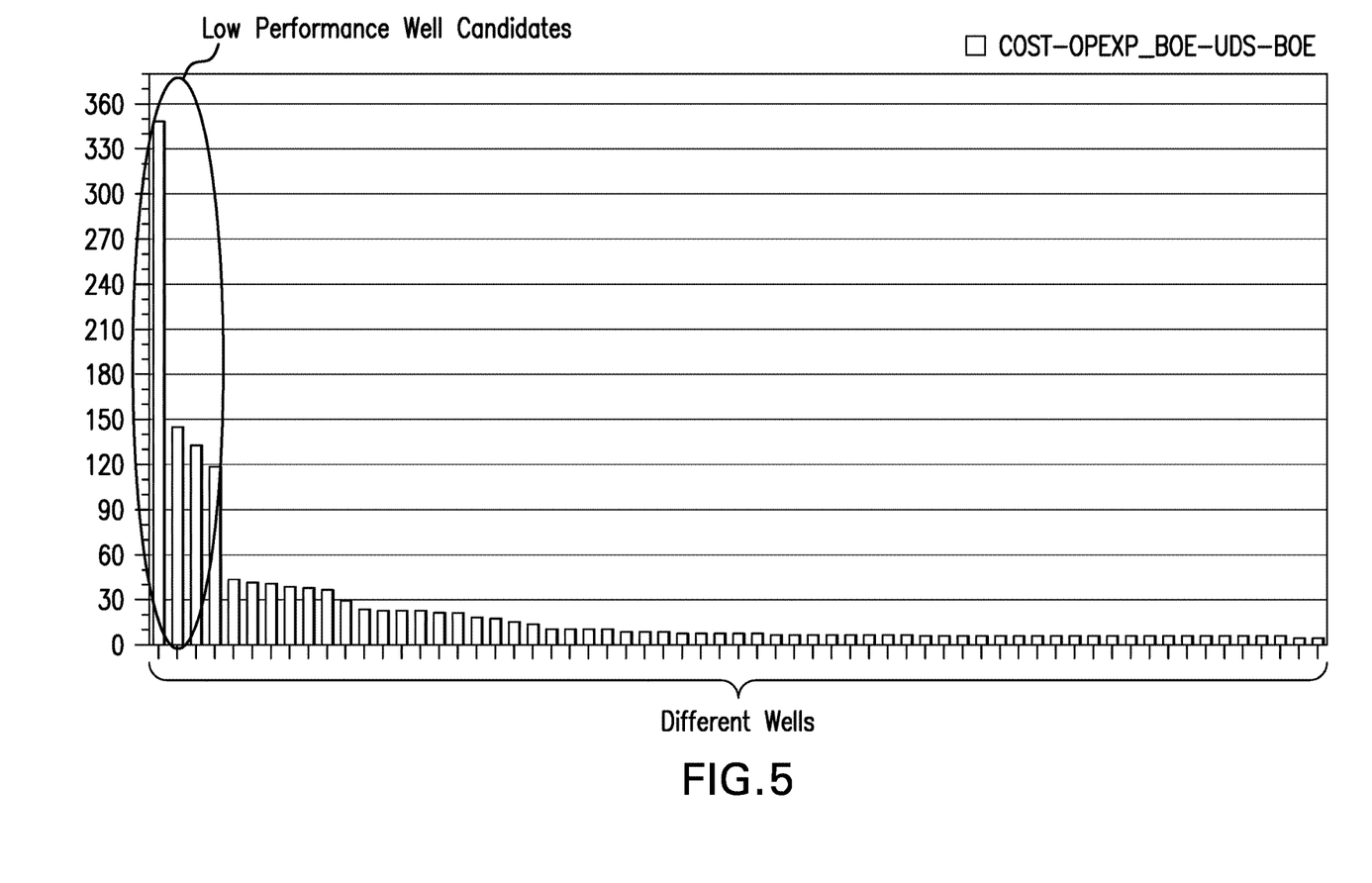
FIG. 5 is a histogram of prior-art key performance indicator values of a single KPI (operational cost per Barrel of Oil Equivalent Produced) for a plurality of wells.
Figure 6:
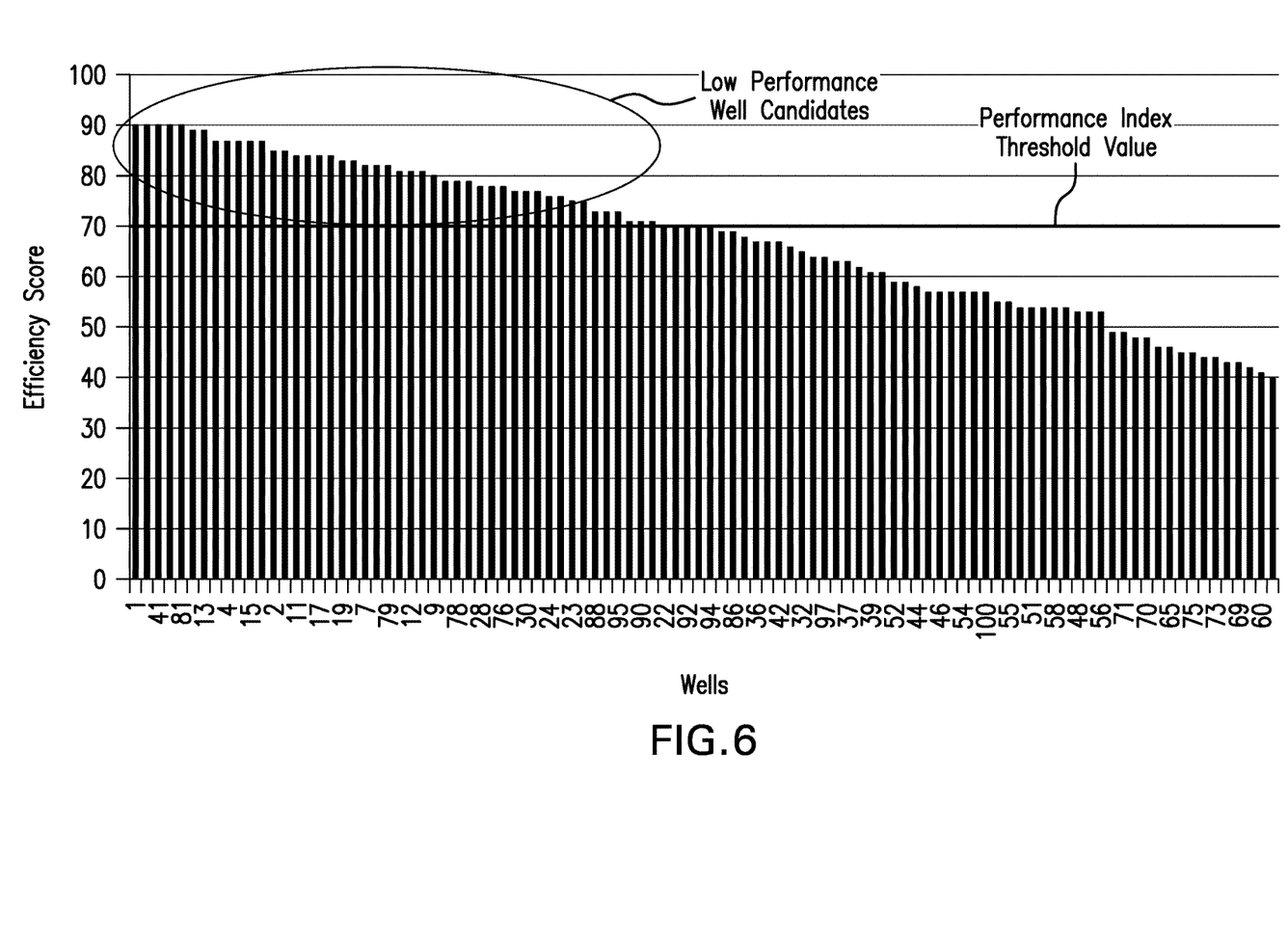
FIG. 6 is a histogram of a unit-less performance index value for a plurality of wells.

The method and apparatus disclosed herein provides several advantages. Using prior art key performance indicators only provides one measure or performance whereas the performance index values disclosed herein consider a plurality of performance indicators. FIG. 5 illustrates a prior-art histogram of values of a single KPI (operational cost per Barrel of Oil Equivalent Produced) for a plurality of wells, while FIG. 6 illustrates a histogram of performance index values for another plurality of wells. FIG. 5 shows that four wells have significantly higher costs than the other wells and therefore require attention. However, other wells in FIG. 5 may also be low performance wells based on other attributes, but are not identifiable by a single KPI alone. It can be seen that more wells are identified as being low performance wells in FIG. 6 than can be identified in FIG. 5 due to the performance index values evaluating a plurality of attributes. Hence, the prior art KPIs may give a false impression that some wells have acceptable performance when in fact they may be low performers or have low performance attributes that need correcting. Therefore, one advantage is that the performance index values can catch all low performing wells, regardless of the issue causing the low performance. Another advantage is that use of the performance index values streamlines the review process by having a single review process. Yet another advantage is that use of the performance index value scoring system may be used on any assets on which performance ranking is required.

Embodiment 1

A method for ranking performance of each production well in a plurality of production wells, the method comprising: sensing a production parameter value for each production well using a sensor; receiving the production parameter value for each production well using a processor; performing with the processor two or more different calculations for each production well using the production parameter value, each calculation providing a calculated performance indicator; multiplying with the processor each calculated performance indicator by a weight factor to provide a weighted performance indicator; summing with the processor each of the weighted performance indicators for each production well to provide a unit-less performance index value for each production well; inputting into the processor a threshold value of the unit-less performance index; and identifying any production well that has a corresponding unit-less performance index value that exceeds the unit-less performance index threshold value as an under-performing well using the processor.

Embodiment 2

The method of any prior embodiment, transmitting a signal comprising one or more unit-less performance index values to a signal receiving device.

Embodiment 3

The method of any prior embodiment, wherein the signal receiving device is a display or printer and the method further comprises displaying the one or more unit-less performance index values to a user.

Embodiment 4

The method of any prior embodiment, wherein the signal receiving device is memory or a storage medium and the method further includes storing the one or more unit-less index values.

Embodiment 5

The method of any prior embodiment, further comprising performing an action on an underperforming well to improve the unit-less performance index value of the corresponding underperforming well.

Embodiment 6

The method of any prior embodiment, further comprising automatically issuing a work order to perform the action.

Embodiment 7

The method of any prior embodiment, wherein the production parameter value comprises at least one of inflow rate, bottomhole pressure, and production rate.

Embodiment 8

An apparatus for ranking performance of each production well in a plurality of production wells, the apparatus comprising: a production rig disposed at each production well; a sensor disposed at each production rig and configured to sense a production parameter; and a processor configure to: receive the production parameter value for each production well; perform two or more different calculations for each production well using the production parameter value, each calculation providing a calculated performance indicator; multiply each calculated performance indicator by a weight factor to provide a weighted performance indicator; sum each of the weighted performance indicators for each production well to provide a unit-less performance index value for each production well; receive a threshold value of the unit-less performance index; and identify any production well that has a corresponding unit-less performance index value that exceeds the unit-less performance index threshold value as an under-performing well.

Embodiment 9

The apparatus of any prior embodiment, wherein the sensor is configured to sense at least one of inflow rate into the borehole, extraction flow rate, temperature, pressure, speed, temperature, vibration, voltage, current and power.

Embodiment 10

The apparatus of any prior embodiment, wherein the processor is further configured to transmit a signal comprising one or more unit-less performance index values to a signal receiving device.

Embodiment 11

The apparatus of any prior embodiment, wherein the signal receiving device comprises at least one of a display, a printer, a storage medium and memory.

Embodiment 12

The apparatus of any prior embodiment, wherein the processor is further configured to automatically issue a work order to perform an action on an underperforming well to improve the unit-less performance index value of the corresponding underperforming well.

In support of the teachings herein, various analysis components may be used, including a digital and/or an analog system. For example, the production rig 5, the production sensor 6, and/or the computer processing system 7 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first," "second," and the like do not denote a particular order, but are used to distinguish different elements.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for transforming equipment or a device of a production well based on ranking performance of each production well in a plurality of production wells, the method comprising:
 sensing a production parameter value for each production well using a sensor;
 receiving the production parameter value for each production well using a processor;
 performing with the processor two or more different calculations for each production well using the production parameter value, each calculation providing a calculated performance indicator;
 multiplying with the processor each calculated performance indicator by a weight factor to provide a weighted performance indicator;
 summing with the processor each of the weighted performance indicators for each production well to provide a unit-less performance index value for each production well;
 inputting into the processor a threshold value of the unit-less performance index;
 identifying any production well that has a corresponding unit-less performance index value that exceeds the unit-less performance index threshold value as an under-performing well using the processor; and
 transforming the equipment or the device by at least one of repairing, modifying, and replacing the equipment or the device for any production well identified as underperforming in order to improve performance.

2. The method according to claim 1, transmitting a signal comprising one or more unit-less performance index values to a signal receiving device.

3. The method according to claim 2, wherein the signal receiving device is a display or printer and the method further comprises displaying the one or more unit-less performance index values to a user.

4. The method according to claim 2, wherein the signal receiving device is memory or a storage medium and the method further includes storing the one or more unit-less index values.

5. The method according to claim 1, further comprising performing an action on an underperforming well to improve the unit-less performance index value of the corresponding underperforming well.

6. The method according to claim 5, further comprising automatically issuing a work order to perform the action.

7. The method according to claim 1, wherein the production parameter value comprises at least one of inflow rate, bottomhole pressure, and production rate.

8. An apparatus for producing hydrocarbons based on ranking performance of each production well in a plurality of production wells, the apparatus comprising:
 a production rig disposed at each production well;
 a sensor disposed at each production rig and configured to sense a production parameter; and
 a processor configure to:
  receive the production parameter value for each production well;
  perform two or more different calculations for each production well using the production parameter value, each calculation providing a calculated performance indicator;
  multiply each calculated performance indicator by a weight factor to provide a weighted performance indicator;
  sum each of the weighted performance indicators for each production well to provide a unit-less performance index value for each production well;
  receive a threshold value of the unit-less performance index; and
  identify any production well that has a corresponding unit-less performance index value that exceeds the unit-less performance index threshold value as an under-performing well;
 equipment or a device that is transformed by at least one of repairing, modifying, and replacing the equipment or the device of a production well that is identified as under-performing in order to increase performance.

9. The apparatus according to claim 8, wherein the sensor is configured to sense at least one of inflow rate into the borehole, extraction flow rate, temperature, pressure, speed, temperature, vibration, voltage, current and power.

10. The apparatus according to claim 8, wherein the processor is further configured to transmit a signal comprising one or more unit-less performance index values to a signal receiving device.

11. The apparatus according to claim 10, wherein the signal receiving device comprises at least one of a display, a printer, a storage medium and memory.

12. The apparatus according to claim 8, wherein the processor is further configured to automatically issue a work order to perform at least one of repairing, modifying, and replacing the equipment or the device on an underperforming well to improve the unit-less performance index value of the corresponding underperforming well.

* * * * *